No. 848,492. PATENTED MAR. 26, 1907.
A. REES.
POULTRY FEEDER AND WATERER.
APPLICATION FILED JUNE 13, 1906.
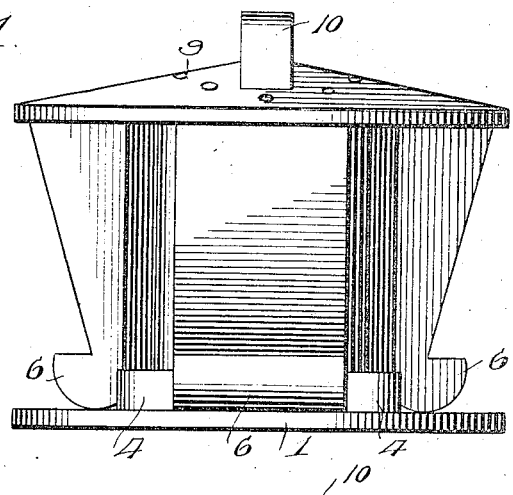
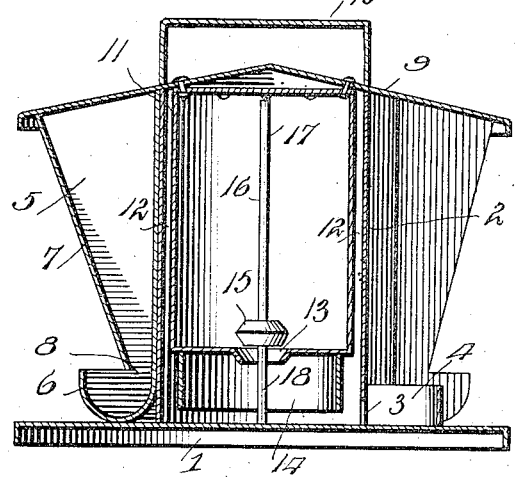
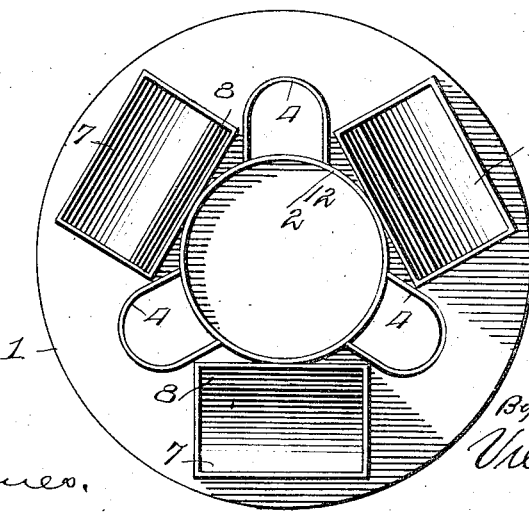
Witnesses
Frank Hough
C. C. Hines.
Inventor
A. Rees.
By
Victor J. Evans.
Attorney

UNITED STATES PATENT OFFICE.

ABRAM REES, OF BUNKER HILL, INDIANA.

POULTRY FEEDER AND WATERER.

No. 848,492.  Specification of Letters Patent.  Patented March 26, 1907.

Application filed June 13, 1906. Serial No. 321,486.

*To all whom it may concern:*

Be it known that I, ABRAM REES, a citizen of the United States of America, residing at Bunker Hill, in the county of Miami and State of Indiana, have invented new and useful Improvements in Poultry Feeders and Waterers, of which the following is a specification.

This invention relates to a device adapted for feeding and watering poultry, the object of the invention being to provide a simple, inexpensive, efficient, and ornamental device of this character adapted to prevent waste of the food and water and to supply the same automatically for consumption as fast as it is consumed by the fowls, and, further, to so construct the device as to secure convenience in refilling the same with food and water and safety in feeding the water to the drinking-troughs, so as to prevent the same from overflowing and avoid liability of the drowning of young chicks.

In the drawings, Figure 1 is a view in elevation of a poultry feeding and watering device embodying my invention. Fig. 2 is a central vertical section of the same. Fig. 3 is a top plan view with the cover and fountain removed.

The device is preferably made throughout of sheet metal and comprises a base 1, from which rises a tubular water-reservoir 2, open at its upper end and provided at its lower end with outlets 3, communicating with shallow drinking cups or troughs 4, mounted on the base outside the reservoir. The base and reservoir support a series of feed-boxes or receptacles 5, grouped around the reservoir in alternation with the drinking-troughs and each provided at its lower end with a trough or feed-chamber 6. Each feed-box or receptacle is open at its upper end for the introduction of the food thereinto, which feeds by gravity down into the trough 6 and has its forward wall 7 inclined downwardly and inwardly to gradually reduce the size of the receptacle and provide a contracted throat or passage 8 for the uniform and gradual supply of feed to the trough, allowing only a sufficient quantity of food to pass to the trough to compensate for that consumed by the poultry.

A removable cover 9 is provided to rest upon and close the reservoir 2 and feed-boxes 5 and is provided with a handle 10 for convenience in manipulating it. Secured to and depending from this cover is a fountain 11, which is cylindrical in form and adapted to fit within the reservoir 2. The fountain is of somewhat less length than the reservoir and of less diameter than the same to leave an intervening passage 12 for a purpose hereinafter described and is closed at its upper end and provided at its lower end with a filling-aperture and outlet 13. The outlet 13 is formed in the bottom of the fountain, from which depends a relatively narrower nozzle or shield 14, which terminates above the surface of the base 1 and below the level of the upper ends of the outlets 3. A gravity-valve 15 is provided to control the outlet 13 and is carried by stem 16, having a long upper extremity 17, disposed within the fountain, and a shorter lower extremity 18, projecting downward through the outlet. The cover 9 is preferably conical in form, so that it, in conjunction with the form and arrangement of the reservoir, feed-boxes, and drinking-troughs, will impart a neat and ornamental appearance to the device.

In the operation of storing the device with food and water for use the cover is lifted upwardly, thus exposing the upper open ends of the feed-boxes 5 and withdrawing the fountain from the reservoir. The boxes 5 are then filled to the desired extent with the food to be supplied to the poultry, after which the fountain is filled while in an inverted position with water through the aperture 13, the valve 15 moving by gravity inwardly from said aperture upon the inversion of the fountain to permit it to be filled and being limited in such inward movement by contact of the stem-arm 17 with the top wall of the fountain. The cover and fountain are then applied for use in the manner shown in Fig. 2. When the fountain is inserted, the discharge of water from the same is prevented by the closure of the outlet 13 by the valve 15; but as soon as the fountain is fully applied in position the lower extremity 18 of the valve-stem will engage the base 1, and the valve will be forced open to allow the water to discharge. The water will accordingly flow from the fountain through the outlet 13 and fill the lower portion of the reservoir and also extend upward into the space or passage 12, thus sealing the reservoir in such a manner that the water will be retained therein and its feed regulated by exterior atmospheric pressure, the water being supplied to the cups 4 through the outlets 3 up to the level of the top of said outlets. As the water in the cups is consumed or evaporates and falls below such level an equivalent amount automatically flows thereinto through the outlets, and this operation is continued until the full supply of water in the fountain and reservoir is exhausted. The function of the reduced tubular extension or nozzle 14 is to insure the regular and even flow of the water from the fountain to the reservoir and prevent gushing or irregularities in the even feed of the water. Owing to the fact that the cups or troughs 4 are shallow and contain but a small amount of water, young chicks and small poultry may drink therefrom without liability of falling therein and drowning.

It will be seen that the invention provides a device for the purpose described which is simple of construction, efficient in use, ornamental in appearance, and susceptible of being manufactured and sold at a low cost and which may be readily and conveniently replenished with food and water.

Having thus described the invention, what is claimed as new is—

1. A device of the character described comprising a base, a reservoir-tube rising therefrom and provided at its lower end with outlets, feed-troughs formed independently of the reservoir and arranged in spaced relation on the exterior thereof, drinking-troughs communicating with said outlets and grouped with the feed-troughs in alternation around the reservoir, said troughs being arranged in the spaces between the feed-troughs, a cover for closing the reservoir, and a fountain fixed to and applicable and removable with said cover to initially hold a supply of water for passage to the reservoir and thence to the drinking-troughs.

2. A device of the character described comprising a base, a reservoir rising therefrom, said reservoir being open at its upper end and provided at its lower end with outlets, feed-troughs vertically arranged upon the exterior of the reservoir, said troughs being independent of said reservoir and grouped around the same in alternation with the drinking-troughs, a cover for closing the reservoir and feed troughs, and a fountain fixed to said cover and adapted to fit within the reservoir.

3. A device of the character described comprising a base, a reservoir rising therefrom, said reservoir being open at its upper end and provided at its lower end with outlets, drinking-troughs on the exterior of the reservoir and communicating with said outlets, feed-troughs formed independently of the reservoir and grouped upon the base around the reservoir in alternation with the drinking-troughs, said feed-troughs being provided at their lower ends with outlets and having their outer walls downwardly and inwardly inclined to form contracted throats communicating with said outlets, a cover for closing the reservoir and feed-troughs, and a fountain fixed to said cover and adapted when the latter is applied in position to be received into the reservoir.

4. A device of the character described comprising a base, a reservoir rising therefrom and provided at its lower end with an outlet, a drinking-trough communicating therewith through said outlet, a cover for closing the reservoir, a fountain connected to and suspended from the cover and provided in its bottom with an outlet and a contracted shield extending below the outlet, a gravity-valve controlling the outlet, and a stem carrying said valve and operative to engage the top of the fountain to limit the opening movement of the valve when the fountain is inverted and to engage the base and force the valve open when the fountain is inserted in the reservoir for use.

In testimony whereof I affix my signature in presence of two witnesses.

ABRAM REES.

Witnesses:
OMER HOOVER,
J. T. LISTON.